United States Patent [19]

Masaryk

[11] 3,963,508

[45] June 15, 1976

[54] CALCIUM ALUMINATE CEMENT

[75] Inventor: Joseph S. Masaryk, Castro Valley, Calif.

[73] Assignee: Kaiser Aluminum & Chemical Corporation, Oakland, Calif.

[22] Filed: Nov. 18, 1974

[21] Appl. No.: 524,903

[52] U.S. Cl.................................. 106/104; 106/64
[51] Int. Cl.².......................................... C04B 7/32
[58] Field of Search.............................. 106/64, 104

[56] References Cited
UNITED STATES PATENTS

| | | | |
|---|---|---|---|
| 3,395,032 | 7/1968 | Criss | 106/64 |
| 3,507,332 | 4/1970 | Venable et al. | 106/104 |
| 3,617,319 | 11/1971 | Sadran et al. | 106/104 |

*Primary Examiner*—J. Poer
*Attorney, Agent, or Firm*—Paul E. Calrow; Malcolm McQuarrie

[57] ABSTRACT

A refractory cement is made by combining a clinker which is substantially all $CaO.Al_2O_3$ (CA) with a roughly equal weight amount of an alumina which has been calcined to produce a carefully controlled morphology, particularly specific surface and pore size within relatively narrow ranges. Both materials are very finely divided, at least 80% passing a 325 mesh screen.

31 Claims, 3 Drawing Figures

3,963,508

CALCIUM ALUMINATE CEMENT

BACKGROUND OF THE INVENTION

This invention concerns cements, and particularly calcium aluminate refractory cements.

Refractory products known as castables are made by combining refractory aggregate, for example calcined bauxite or tabular alumina, with cement (i.e., a material which will react with water to form solid hydrated phases, yielding a solid monolithic structure when the mass has set). Castables are used by mixing with water (generally in an amount from 5 to 15% by weight of the dry material in the case of a dense aggregate, and up to about 50% in the case of a porous insulating aggregate), casting (or gunning) into place in forms, and allowing the cast material to set, just as is done with ordinary concrete made with portland cement. However, since refractory castables are intended for use at relatively high temperatures, the cement used must be more refractory (i.e., have a higher melting or softening point) and move volume stable under cyclic heating than is portland cement.

Refractory cements, like portland cements, are made by admixing selected raw materials, for example limestone and alumina or bauxite, and heating them, for example in a rotary kiln, to a temperature at which they react to form phases such as $12CaO.7Al_2O_3$ ($C_{12}A_7$), $CaO.Al_2O_3$ (CA), and $CaO.2Al_2O_3$ ($CA_2$). This clinker is then ground, for example until at least 75% passes a 325 mesh screen, to form the refractory cement.

It has been found that a clinker in which CA (i.e., $CaO.Al_2O_3$, a distinct mineral phase) constitutes a major portion of the composition forms a very satisfactory refractory cement. However, from the $CaO-Al_2O_3$ phase diagram it can be determined that such a clinker has a melting point of about 1600°C. Often, it is desired to have a refractory cement which is more refractory than one made with CA clinker.

It is known to make a clinker of higher alumina content so that it contains both the CA phase and the $CA_2$ phase. From the $CaO-Al_2O_3$ phase diagram, it can be seen that such a clinker is more refractory than one which is solely CA. However, the presence of $CA_2$ in the clinker tends to reduce the strength at intermediate temperatures and may slow the hardening rate of the concrete in which it is used. Since refractory castables are often used to repair furnaces in the middle of a campaign, it is highly desirable that they harden as rapidly as possible so as to minimize the time the furnace is out of use for repair. Thus, cements in which the setting ingredient is substantially all CA are preferred for their greater strength and more rapid hardening. It is also known to increase the refractoriness of a calcium aluminate cement by adding finely divided alumina to the clinker after it is made.

Nearly all cements show a decrease in strength upon heating from room temperature to elevated temperatures. This is due to decomposition of the hydrated cementitious materials formed during room temperature hardening. At higher temperatures (e.g., at temperatures of from 1200°C upwards), the strength of the castable increases again due to formation of a ceramic bond. Thus, concretes made with refractory cements exhibit relatively low strengths at intermediate temperatures (i.e., in the region of 1000° to 1100°C). The strength at intermediate temperatures therefore represents a critical property, since this is the weakest point in the refractory. (It will be understood that in most applications, for example in a furnace wall, there will be a temperature gradient through the thickness of a cast section, and that the weakest point will be the point which is at an intermediate temperature, for example around 1000°C.)

It has been suggested, in U.S. Pat. No. 3,617,319, to overcome this problem of low intermediate strength in cements made with clinker and added alumina by including a flux such as cryolite ($AlNa_3F_6$) which will melt at intermediate temperatures and help create a ceramic bond. However, such cements have the shortcomings that addition of the flux makes them less creep resistant, and also reactive with silica, forming silicon fluoride gas. Therefore, they cannot be used with refractory aggregates containing silica, for example the very commonly used aluminosilicate aggregates. In other words, cements containing fluoride fluxes should only be used with low silica aggregates.

The present invention provides a refractory calcium aluminate cement of good refractoriness, rapid hardening, and good strength, both at room temperature and at intermediate temperatures.

SUMMARY OF THE INVENTION

It has now been found, according to this invention, that an improved refractory calcium aluminate cement can be made by admixing (a) from 40 to 60% by weight of a clinker at least 80% by weight of which is the CA phase with (b) from 60 to 40% by weight of an alumina which has a specific surface of from 1 to 30 m²/g, an average pore size of from 0.05 to 0.5 microns, and a brain coral morphology; the clinker and the alumina having been ground, after admixing, so that 80% by weight passes a 325 mesh screen.

DETAILED DESCRIPTION

Figure 1:
FIG. 1 is a scanning electron micrograph of an alumina suitable for use in this invention.

The clinker used in this invention is at least 80% by weight, and preferably at least 95%, CA. The amount of CA in the clinker is a function of both the purity of the raw materials used to make the clinker, and control of the relative proportions of $Al_2O_3$-yielding and CaO-yielding materials. These materials will be at least 95% pure, and preferably at least 98% pure. While the $Na_2O$ content of the $Al_2O_3$-yielding material is not critical, it will generally be less than 1%, for example 0.5% or less. The $Al_2O_3$-yielding material may be aluminum hydroxide or calcined or tabular alumina; limestone is a suitable raw material for the CaO-yielding material.

The amounts of the raw materials will be selected so as to produce as nearly as possible 1 mole of CaO for each mole of $Al_2O_3$ in the clinker. If there is an excess of CaO-yielding material, there will be the $C_{12}A_7$ phase in the clinker. The presence of this phase is undesirable since it can lead to a very rapid or "flash" set in the cement. If an excess of $Al_2O_3$-yielding material is present, $CA_2$ will form. As previously indicated, the presence of this material tends to slow the rate of hardening of the concrete, leading to relatively lower strengths, for example 24 hours after casting.

As is well known in the cement art, the raw materials will be relatively finely ground, for example substantially all passing a 65 mesh screen, before being fired. The thoroughly admixed and ground materials are fired, for example in a rotary kiln, to a temperature of from 1400° to 1600°C. It has been found that a temperature of about 1500°C is quite suitable for forming the CA clinker used in this invention.

The morphology of the alumina added to the clinker is critical to the practice of this invention. Essentially, it is an alumina of intermediate surface area. Aluminas which have been calcined at lower temperatures and have very high surface areas tend to absorb water during casting of the concrete, thereby requiring excessive amounts of water in the casting operation. This excess water leads to decreased strengths, both at room temperature and at elevated temperatures. On the other hand, aluminas which have been calcined at too high a temperature, or in the presence of a mineralizer, have relatively low surface areas and are not sufficiently reactive to form an adequate ceramic bond in the refractory castable at intermediate temperatures. This leads to low intermediate temperature strengths.

More specifically, the alumina used in this invention has a specific surface of from 1 to 30 m$^2$/g, preferably from 1 to 10 m$^2$/g, for example about 5 m$^2$/g. It has an average pore size between 0.05 and 0.5 microns, for example about 0.15 microns. It is preferred that the size range of the pores be relatively narrow; for example, for a material with an average pore size of 0.15 microns, at least 50% of the pores would be between 0.05 and 0.50 microns. The material will have a specific pore volume between 0.1 and 0.5 cc per gram, for example about 0.3 cc/g. While the crystalline form of the added alumina will depend on the conditions under which it is calcined, in general, it will be 50% or more in the alpha crystal form. However, it will be understood that the specific surface, and not the crystal form, of the added alumina is the essential criterion for use in this invention. While Na$_2$O content of the added alumina is not critical, it should be less than 1%, for example 0.5% or less. A "low soda" alumina is not required.

FIG. 1 shows the typical "brain coral" morphology of an alumina suitable for use in this invention. Commercially available aluminas which are suitable are those sold by Reynolds Metals Corporation under the name RC-23, by Kaiser Aluminum & Chemical Corporation under the designation C-4, and by the Aluminum Company of America under the designation A-3.

Aluminas suitable for use in this invention can be made by calcining an aluminum trihydrate, for example gibbsite formed in the Bayer process, to a temperature of from 800° to 1500°C, for example at about 1200°C. It will be understood that different raw materials may require different calcining temperatures and/or times, and that the essential point is to obtain the specified morphological characteristics.

As is well understood in the cement art, both the clinker and alumina must be finely ground, for example at least 80% passing a 325 mesh screen, to form a suitable cement. It will generally be necessary to grind both the clinker and the alumina. It will be understood that the clinker must be ground dry, since it will react with any water to form hydration products. Thus, it is possible to grind the clinker separately from the alumina, using wet grinding for the latter (although the alumina will have to be dried before mixing with the clinker). However, it has been found that a superior cement is made if the alumina and the clinker are ground together to at least 80% -325 mesh. More specifically, such a cement yields higher strengths, both at room temperature and at elevated temperatures, when used in a refractory castable. It has been found, oddly enough, that a relatively coarse cement mixture, for example one which is 80% -325 mesh, requires more casting water in the concrete, compared to one which is, for example, 90% -325 mesh. Thus, for reasons set forth below, the finer grind is preferred.

The use of a grinding aid, e.g., triethanolamine or naphthenic acid, for example in an amount from 0.01 to 1% by weight, as is well known in the art, has been found to be advantageous in achieving efficient milling.

Likewise, as is also well known in the art, the addition of a material such as sodium citrate, for example in an amount from 0.1 to 1% by weight, has been found useful in controlling the rate of set of the refractory castable. Preferably it is added to the clinker, alumina, and grinding aid prior to milling.

The cement thus made is used by admixing it in an amount from 5 to 50% by weight, for example about 30% by weight, based on the total weight of dry material, with sized refractory aggregate, as is well known in the art. Since the cement of this invention is a highly refractory cement, the aggregate used will be of relatively high purity, for example a calcined or tabular alumina, or mixtures of these or equivalent materials. Insulating (i.e., porous) aggregate can be used.

In use, the refractory castable is mixed with from about 5 to 15% water, for example about 8%, and cast into forms. (Up to 50% water may be used if the aggregate has high porosity.) The critical properties of the refractory castable are its strength adfter drying for 24 hours at 105°C, and its strength after heating to an intermediate temperature, for example to 1100°C. In a high purity castable of 70 parts by weight sized tabular alumina and 30 parts cement according to this invention, it has been found desirable to have a 24-hour dried strength of at least 10,000 psi (pounds per square inch), about 700 kg/cm$^2$, in a cold crushing test, and to have a strength after heating to 1100°C at least about 75% of the 24-hour dried strength. In other words, after heating to 1100°C this castable should have a strength of at least 7500 psi (roughly 500 kg/cm$^2$) in a cold crushing test.

One of the critical factors in the strength of a concrete is the amount of water used to form a castable consistency. More specifically, the larger the amount of water used, the lower the strength of the hardened concrete. In practice, the minimum amount of water needed to make a castable consistency is added to the concrete. Accordingly, a concrete which requires less water to form a castable consistency will tend to have higher strength. One of the advantages of cements made according to the present invention is that the amount of water required to reach a castable consistency, when the cement is used with refractory aggregate to form a concrete, is less than prior art cements; therefore, concretes made with the cement of the present invention have higher strengths.

One factor that affects the amount of casting water is the reactivity of the clinker. This can be lowered by higher firing temperatures and by the addition of sodium citrate. Also, the amount of casting water is affected by the specific surface of the added alumina, the greater the specific surface the greater the amount of water needed, within limits.

It may be noted that the relative strength retention upon heating a castable made with a CA cement with added alumina to 1100°C is a function of the morphology of the added alumina, whereas the absolute value of the strength, either after drying or after heating to 1100°C, is a function of the amount of casting water used. Using an added alumina according to this invention leads to high retained strengths (75% or better) and also permits the use of less casting water, leading to higher absolute strengths.

EXAMPLE

Clinker was made by admixing 50.3 parts alumina and 49.7 parts Mississippi Lime Company high calcium limestone as a water slurry. The alumina was unground Bayer alumina sold by Aluminum Company of America under the designation A-2; about 80% passed a 100 mesh screen and was retained on a 325 mesh screen. The limestone was over 99% −325 mesh. The admixture was ground in a ball mill until 98% was −325 mesh. The ground admixture was fired at 1532°C for 1 hour, and after firing was shown by petrographic examination to be 99% CA, the remainder being other calcium aluminate phases and unreacted alumina.

Fifty-three parts of this clinker and 47 parts of the alumina sold by Reynolds Metals Company under the name RC-23 (shown in FIG. 1) were mixed with 0.3 part sodium citrate dihydrate and 0.1 part triethanolamine (grinding aid), and ball milled for 6 hours until 95% of the material was −325 mesh. The RC-23 alumina was 93% of the alpha form, had a specific surface of 5.5 m$^2$/g, an average pore size of 0.15 microns, and a specific pore volume of 0.3 cc/g.

The cement thus made was mixed with sized tabular alumina, all of which passed a 6 mesh screen, and substantially all of which was retained on a 325 mesh screen, in the proportion of 70 parts tabular alumina and 30 parts cement. This concrete was mixed with 7.8% water, dry weight basis (dwb), and cast into 2 inch (about 5 cm) cubes. These specimens had a bulk density of 175 pounds per cubic foot (pcf) (2.80 g/cc) after drying for 24 hours at 105°C and of 163 pcf (2.61 g/cc) after heating to 1100°C for 5 hours. Their average cold crushing strength after the 105°C drying was 15,020 psi (1058 kg/cm$^2$), and after heating to 1100°C was 12,140 psi (855 kg/cm$^2$). It can be seen that after heating to 1100°C the specimens retained 80% of their dried strength. (Cold crushing strength was determined according to the procedure of ASTM C39-72 except for the size of the specimens).

Figure 2:
FIG. 2 is a scanning electron micrograph of an alumina with a higher specific surface than that shown in FIG. 1.

A first comparison cement was made from the same clinker and in the same way as the preceding example excep that, instead of the RC-23 alumina, an alumina sold by Alcan Aluminum Corporation under the name C-4 (shown in FIG. 2) was used. The C-4 alumina was only 20% in the alpha form, had a specific surface of 71 m$^2$/g, a broad range of pore sizes from about 0.01 to 10 microns, and a specific pore volume of 0.31 cc/g. It is typical of an alumina calcined at a relatively low temperature. When this comparison cement was mixed with the same aggregate in the same amount as the above example, it required 11.5% (dwb) water to cast. The necessity for this relatively high amount of casting water is to be expected because of the very high surface area of the added alumina. It led to low densities and strengths, the density after 105°C drying being 157 pcf (2.51 g/cc), and after heating to 1100°C, 148 pcf (2.37 g/cc). The cold crushing strength of this comparison concrete was 8370 psi (589 kg/cm$^2$) after 105°C drying, and only 2820 psi (199 kg/cm$^2$) after the 1100°C heating. In other words, after heating to 1100°C this comparison concrete retained only 34% of its (relatively low) dried strength.

Figure 3:
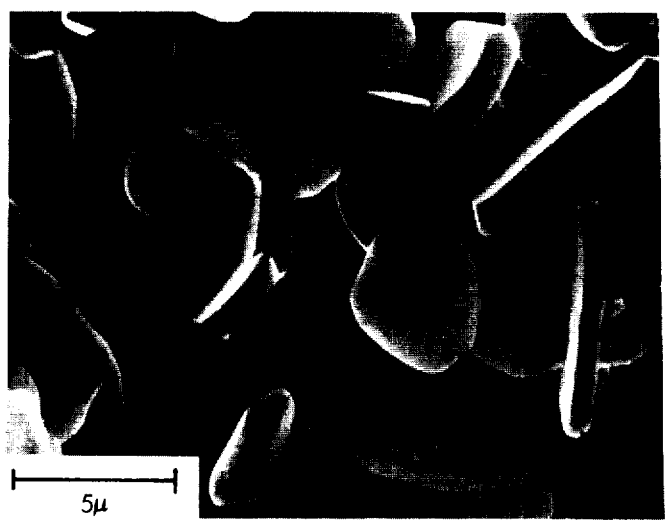
FIG. 3 is a scanning electron micrograph of an alumina with a lower specific surface than that shown in FIG. 1.

A second comparison cement was made in the same way as the first example except that, in place of the RC-23 alumina, an alumina sold by Aluminum Company of America under the designation A-2 (shown in FIG. 3) was used. The alumina was about 90% of the alpha phase, had a specific surface of 0.4 m$^2$g, an average pore size of about 2 microns, and a specific pore volume of 0.35 cc/g; it is typical of an alumina calcined in the presence of a mineralizer. When this second comparison cement was admixed with the same amount of the same aggregate, it required 9% (dwb) water to cast. The reason this comparison cement with an alumina of lower specific surface required more water to cast than did cement made according to this invention is not clear, but it had the expected affect of lowering the strength and, to a certain extent, the density of the set concrete. After 105°C drying, the density was 172 pcf (2.76 g/cc) and the cold crushing strength 9440 psi (665 kg/cm$^2$). After heating to 1100°C, the density was 158 pcf (2.53 g/cc) and the cold crushing strength 5760 psi (406 kg/cm$^2$). It can be seen that only 60% of the 105°C dried strength was retained after heating to 1100°C.

A final comparison can be made between the cement made according to this invention and what is believed to be the most closely comparable, commercially available prior art cement, that sold by Aluminum Company of America under the designation CA-25. When CA-25 cement was admixed with the same aggregate in the same proportion as in the original example, the concrete required 9.5% (dwb) water to cast. After drying at 105°C, specimens of this last comparison concrete had an average density of 165 pcf (2.64g/cc), and cold crushing strength of 10,380 psi (731 kg/cm$^2$). After heating to 1100°C, density was 155 pcf (2.48 g/cc) and cold crushing strength 7700 psi (542 kg/cm$^2$). It can be seen that the castable made with CA-25 cement retained nearly 75% of its room temperature strength after heating to 1100°C, but that the overall strength was considerably lower than the strengths obtained using cements of the present invention.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 325 mesh to 44 microns.

What is claimed is:

1. Method of making a refractory calcium aluminate cement comprising: (1) admixing (a) from 40 to 60% of a clinker, at least 80% of which is the CA phase, with (b) from 60 to 40% of an alumina which has a specific surface of from 1 to 30 m$^2$g, an average pore size of from 0.05 to 0.5 microns, and a brain coral morphology; and (2) grinding the clinker and the alumina, after admixing, so that 80% passes a 325 mesh screen, all percentages being by weight.

2. Method according to claim 1 wherein the clinker is at least 95% by weight of the CA phase.

3. Method of making a refractory calcium aluminate cement comprising: (1) grinding a clinker, at least 80% of which is the CA phase, so that 80% passes a 325 mesh screen; (2) grinding an alumina which has a specific surface of from 1 to 10 m²/g, an average pore size of from 0.05 to 0.5 microns, and a brain coral morphology so that 80% passes a 325 mesh screen; and (3) admixing from 40 to 60% of the ground clinker with from 60 to 40% of the ground alumina; all percentages being by weight.

4. Method according to claim 3 wherein the clinker is at least 95% by weight of the CA phase.

5. Method according to claim 13 wherein a grinding aid is added to the clinker and the alumina prior to grinding.

6. Method according to claim 5 wherein the grinding aid is triethanolamine.

7. Method according to claim 3 wherein sodium citrate is added to the admixture.

8. Method according to claim 3 wherein the alumina has a specific surface of about 5 m²/g and an average pore size of about 0.15 microns.

9. Method according to claim 3 wherein the clinker is at least 95% of the CA phase, wherein a grinding aid is added to the clinker and the alumina prior to grinding, and wherein sodium citrate is added to the admixture.

10. Method according to claim 3 wherein the clinker is made by calcining an admixture of an $Al_2O_3$-yielding material and a CaO-yielding material at a temperature of from 1400° to 1600°C.

11. Method according to claim 10 wherein said $Al_2O_3$-yielding material is calcined alumina.

12. Method according to claim 10 wherein said CaO-yielding material is limestone.

13. Method according to claim 12 wherein said $Al_2O_3$-yielding material is calcined alumina and wherein said calcination is carried out at a temperature of about 1500°C.

14. Method according to claim 1 wherein the alumina has a specific surface of from 1 to 10 m²/g.

15. Method according to claim 14 wherein the clinker is at least 95% of the CA phase.

16. Method according to claim 14 wherein a grinding aid is added to the clinker and the alumina prior to grinding.

17. Method according to claim 16 wherein the grinding aid is triethanolamine.

18. Method according to claim 14 wherein sodium citrate is added to the admixture.

19. Method according to claim 14 wherein the alumina has a specific surface of about 5m²/g and an average pore size of about 0.15 microns.

20. Method according to claim 19 wherein the clinker is at least 95% of the CA phase.

21. Method according to claim 20 wherein sodium citrate is added to the admixture.

22. Method according to claim 18 wherein the clinker is at least 95% if the CA phase and wherein a grinding aid is added to the clinker and the alumina prior to grinding.

23. Method according to claim 14 wherein the clinker is made by calcining an admixture of an $Al_2O_3$-yielding material and a CaO-yielding material at a temperature of from 1400° to 1600°C.

24. Method according to claim 23 wherein said $Al_2O_3$-yielding material is calcined alumina.

25. Method according to claim 23 wherein said CaO-yileding material is limestone, 26. Method according to claim 25 wherein said $Al_2O_3$-yielding material is calcined alumina and wherein said calcination is carried out at a temperature of about 1500°C.

27. Refractory calcium aluminate cement consisting essentially of (a) from 40 to 60% of a ground clinker which is at least 80% of the CA phase, and (b) from 60 to 40% finely divided alumina which has a specific surface of from 1 to 10 m²/g, an average pore size of from 0.05 to 0.5 microns, and a brain coral morphology; at least 80% of the cement passing a 325 mesh screen; all percentages being by weight.

28. Cement according to claim 27 wherein the alumina has a specific surface of about 5 m²/g.

29. Cement according to claim 27 wherein the ground clinker is at least 95% of the CA phase.

30. Refractory cement according to claim 29 which contains sodium citrate.

31. Refractory cement according to claim 30 wherein the alumina has a specific surface of about 5 m²/g and an average pore size of about 0.15 microns.

* * * * *

UNITED STATES PATENT OFFICE
CERTIFICATE OF CORRECTION

PATENT NO. : 3,963,508
DATED : June 15, 1976
INVENTOR(S) : Joseph S. Masaryk

It is certified that error appears in the above-identified patent and that said Letters Patent are hereby corrected as shown below:

Column 1, line 22, "move" should be --more--

Column 1, line 66 "to" should be --or--

Column 4, line 36, "adfter" should be --after--

Column 5, line 55, "excep" should be --except--

Column 6, line 12, "The" should be --This--

Column 6, line 62, "$m^2g$" should be --m2/g--

Column 8, line 13, "if" should be --of--

Column 8, line 23, "yileding" should be --yielding--

Signed and Sealed this

Nineteenth Day of October 1976

[SEAL]

Attest:

RUTH C. MASON
Attesting Officer

C. MARSHALL DANN
Commissioner of Patents and Trademarks